(12) United States Patent
Johansson et al.

(10) Patent No.: US 7,835,385 B2
(45) Date of Patent: Nov. 16, 2010

(54) COMMUNICATION ARRANGEMENT IN A BASE STATION IN A CELLULAR MOBILE TELEPHONY SYSTEM

(75) Inventors: Mikael Johansson, Göteborg (SE); Lars Blomstergren, Kullavik (SE); Peter Eriksson, Askim (SE); Måns Cederlöf, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 740 days.

(21) Appl. No.: 11/816,971

(22) PCT Filed: Feb. 28, 2005

(86) PCT No.: PCT/SE2005/000280

§ 371 (c)(1),
(2), (4) Date: Aug. 23, 2007

(87) PCT Pub. No.: WO2006/091133

PCT Pub. Date: Aug. 31, 2006

(65) Prior Publication Data

US 2008/0151859 A1  Jun. 26, 2008

(51) Int. Cl.
*H04L 12/56* (2006.01)
*H04J 1/16* (2006.01)
(52) U.S. Cl. ............ 370/449; 370/216; 370/241; 370/252; 370/329
(58) Field of Classification Search ............ 370/216, 370/241, 252, 329, 449
See application file for complete search history.

(56) References Cited

U.S. PATENT DOCUMENTS

| 5,708,834 | A | 1/1998 | Sasaki et al. | |
|---|---|---|---|---|
| 7,185,045 | B2* | 2/2007 | Ellis et al. | 709/200 |
| 2004/0043750 | A1 | 3/2004 | Kim | |
| 2004/0085894 | A1 | 5/2004 | Wang et al. | |
| 2004/0121776 | A1 | 6/2004 | Kim | |

FOREIGN PATENT DOCUMENTS

EP    1292159 A1    3/2003

* cited by examiner

*Primary Examiner*—John Pezzlo

(57) ABSTRACT

The invention discloses an arrangement (100) in a base station in a cellular mobile telephony system, comprising a first plurality (120-160) of Printed Circuit Boards (PCB:s) and a second plurality of switches (110,190). Each of the PCB:s (120-160) in said first plurality is connected to each of the switches (110,190) in said second plurality. Each of the switches (110,190) is equipped with means for communicating with and polling each of the PCB:s (120-160) at predetermined intervals, said polling being with regard to the status of the PCB. The switches are equipped with means for distributing status information to the individual PCB:s as an outcome of said polling, and the PCB:s are equipped with means for communicating with each other via one, several, or all of the switches, and said communicating means in the PCB:s are arranged to choose routes of communication based on said status information received from the switches.

7 Claims, 4 Drawing Sheets

COMMUNICATION ARRANGEMENT IN A BASE STATION IN A CELLULAR MOBILE TELEPHONY SYSTEM

TECHNICAL FIELD

The present invention discloses an arrangement in a base station in a cellular mobile telephony system, comprising a first plurality of Printed Circuit Boards (PCB:s) and a second plurality of switches. Each of the PCB:s in said first plurality is connected to each of the switches in said second plurality.

BACKGROUND ART

In a new design intended for radio base stations in a cellular telephony network, a design is considered in which a number of Printed Circuit Boards (PCB:s) and a number of switches are used, in which the PCB:s communicate with each other via a redundant configuration, for example using an Ethernet protocol. The redundancy is achieved by letting each of the PCB:s be connected to each of the switches.

In order for the redundancy to offer the intended result, it is necessary to find a solution by means of which the function of the PCB:s and the switches can be supervised.

One such known solution is the so called TIPC-protocol (Transparent Inter Process Communication). A drawback with TIPC is the amount of supervision traffic that it generates, which is a drawback shared by many known solutions.

DISCLOSURE OF THE INVENTION

Thus, the invention is aimed at achieving a solution for supervision of a configuration with redundant communication between PCB:s in a cellular mobile telephony system.

This is obtained by means of arrangement in a base station in a cellular mobile telephony system which comprises a first plurality of Printed Circuit Boards (PCB:s) and a second plurality of switches.

Each of the PCB:s in said first plurality is connected to each of the switches in said second plurality, and each of the switches is equipped with means for communicating with and polling each of the PCB:s at predetermined intervals.

The polling is carried out with regard to the status of the PCB, and the switches are additionally equipped with means for distributing status information to the individual PCB:s as an outcome of said polling.

Also, the PCB:s are equipped with means for communicating with each other via one, several, or all of the switches, and said communicating means in the PCB:s are arranged to choose routes of communication based on the status information received from the switches.

By means of the invention, as will become clear from the following detailed description, a design is obtained which offers supervision of communication links between different PCB:s with a small amount of supervision traffic.

BRIEF DESCRIPTION OF THE DRAWINGS

The invention will be described in more detail in the following with reference to the appended drawings, in which.

EMBODIMENTS

Figure 1:
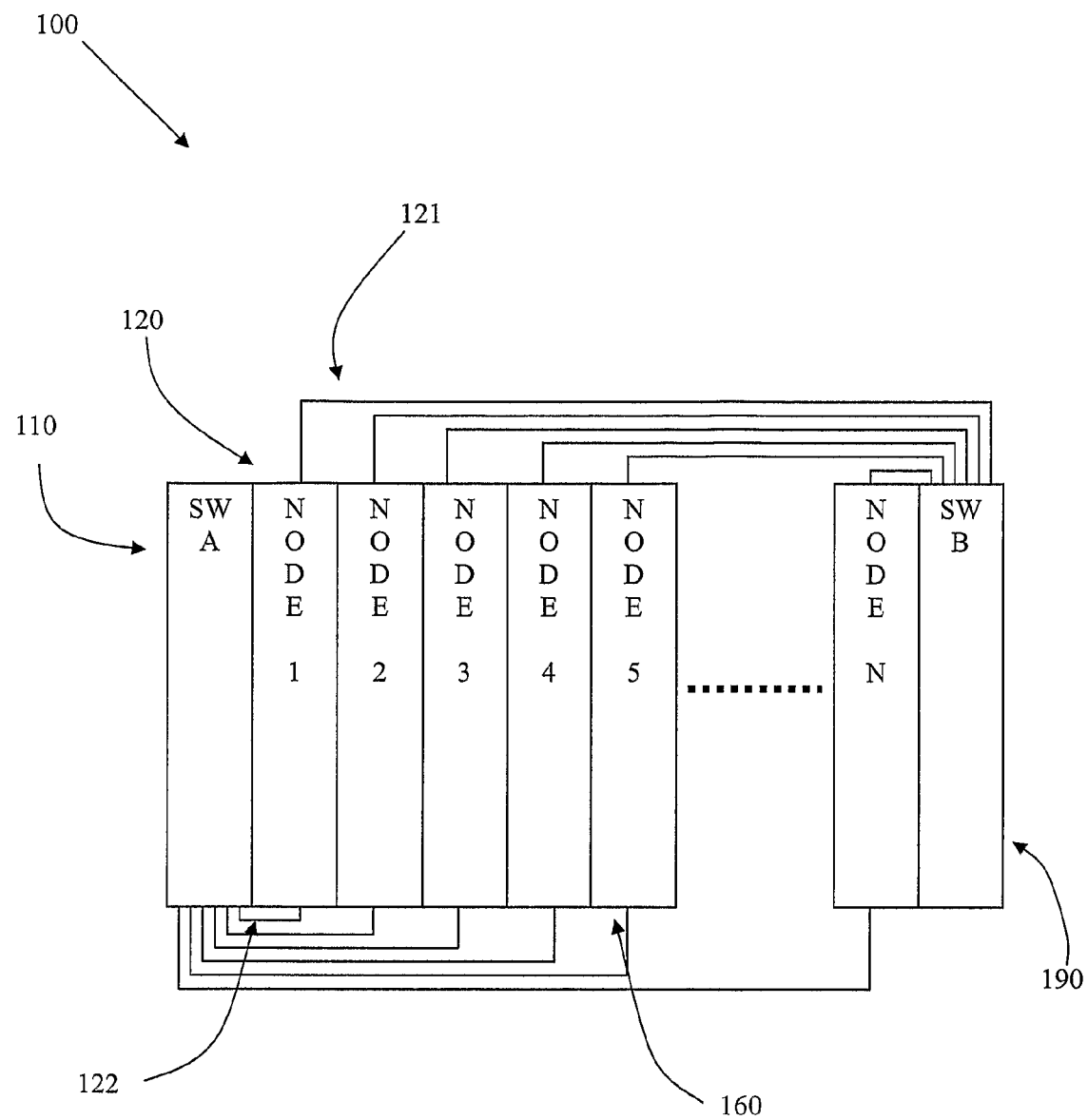
FIG. 1 shows a schematic block diagram of an arrangement according to the invention.

FIG. 1 shows a first embodiment 100 of an arrangement according to the invention. The arrangement comprises plurality of switches, in this case a first 110 and a second 190 switch, preferably but not necessarily Ethernet switches. A switch is here defined as a device which can receive data packets on one or more input ports, and send said packets on one or more output ports. The output ports are selected based upon a set of rules applied to the characteristics of the data packets.

The arrangement also comprises a plurality of Printed Circuit Boards, PCB:s, 120-160. The PCB:s may be different kinds, as an alternative to which two or more of the PCB:s can be of the same kind.

The PCB:s 120-160 are arranged with means for communicating with each other, said means usually being in the form of special control and communication circuits on the PCB:s. As an alternative, these means can be integrated in other circuits on the PCB:s.

In order for the PCB:s to be able to communicate with each other, each PCB 120-160 is connected to both of the switches 110, 190 via a first connection 122 to the first switch 110 and a second connection 121 to the second switch 190. Thus, messages which is sent from a first PCB to a second PCB will be routed via at least one of the switches 110, 190. The choice of which switch or switches to use is made by the communication means on the individual PCB, based on information which will be described later in this text.

It should be noted that although the switches' means for communicating with the PCB:s, the links 121, 122 shown in FIG. 1, are the same as the PCB:s links for communicating with each other, this need not be the case, dedicated links or connections could be imagined for either purpose.

As the PCB:s are intended to communicate via the switches rather than directly to each other, it is important for the communication means in all of the PCB:s, which control the communication route, to become aware of any faulty links between any of the PCB:s and the switches.

In order to detect faulty communications to/from the PCB:s, in the arrangement according to the invention, the switches will at predetermined intervals poll all of the PCB:s. The polling will be with respect to the status of the PCB, the status for example being OK or not OK, NOK, i.e. responding or not responding to poll requests. The status on which it is reported might also, for example, be based on statistics, or the number of data packets queued up.

Figure 2:
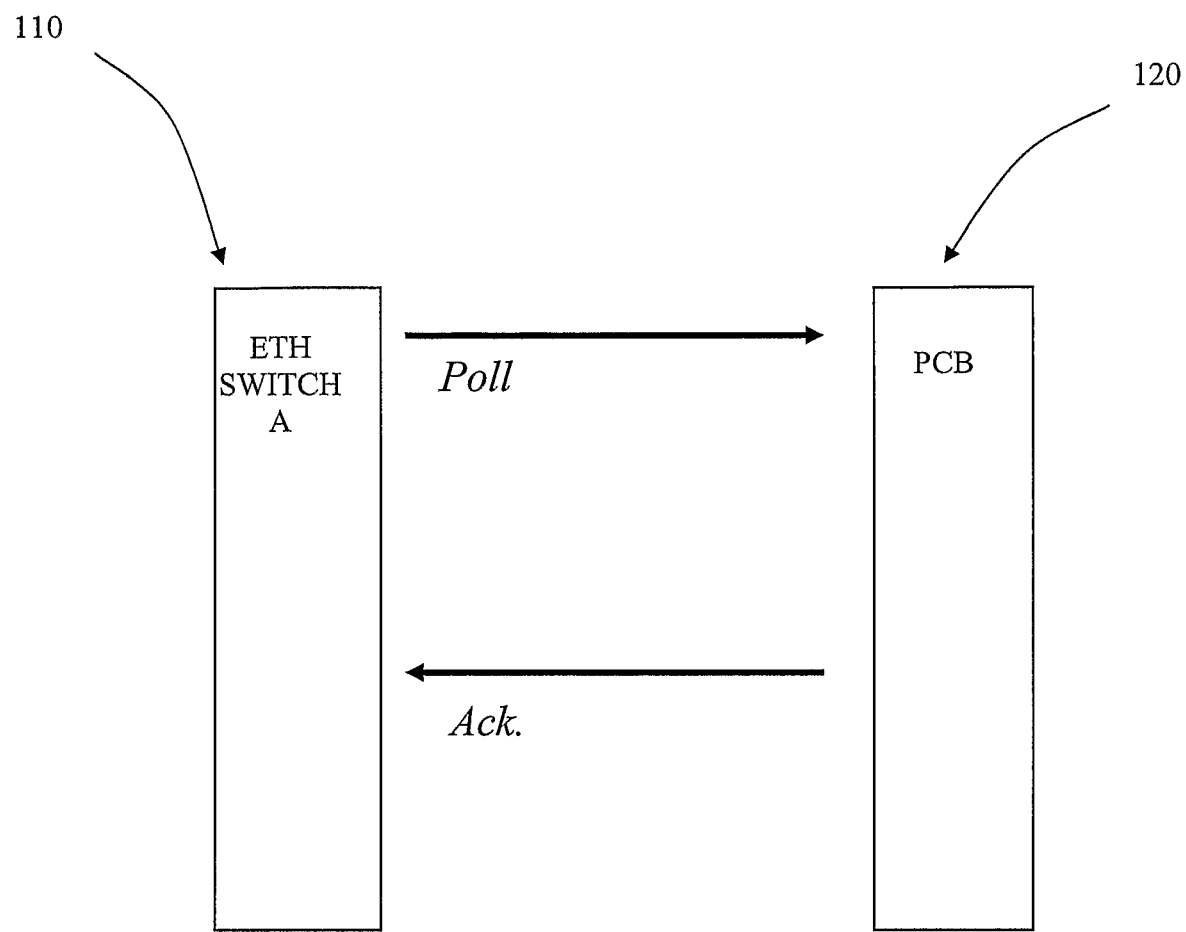
FIG. 2 shows an arrangement and a sequence according to the invention.

The polling is illustrated schematically in FIG. 2: a first switch 110 sends a poll request or poll message to a first PCB 120 via the first switch's link or connection 122 to that PCB, and the PCB replies with a poll acknowledgement or reply. If the PCB doesn't reply within a predefined time, the switch declares the link to the PCB or the PCB as such to be faulty. In either case (faulty link/faulty PCB), the other PCB:s will be unable to communicate with that PCB, at least via that particular link.

Conversely, if a PCB doesn't receive a poll from a switch within the defined interval, the PCB will decide that there is a problem with that switch or the connection (link) to it, and will thus choose to send traffic via one of the other switches until a poll message is received from the switch which was perceived as faulty.

In a particular embodiment of the invention, the poll acknowledgement or reply (or another message from the PCB to the switch) comprises information about the interval with which that particular PCB should be polled. This can be useful in, for example, applications where all PCB:s are not of equal importance. That interval will then be applied until further notice when polling that particular PCB.

In order to enable the control and/or communications circuits on the individual PCB:s to decide which routes (switches) to use when communicating with the other PCB:s, the poll requests/messages from the switches to the PCB:s will comprise a list of network status. The list comprises the latest updates from the PCB:s 120-160 comprised in the arrangement 100.

Figure 3:
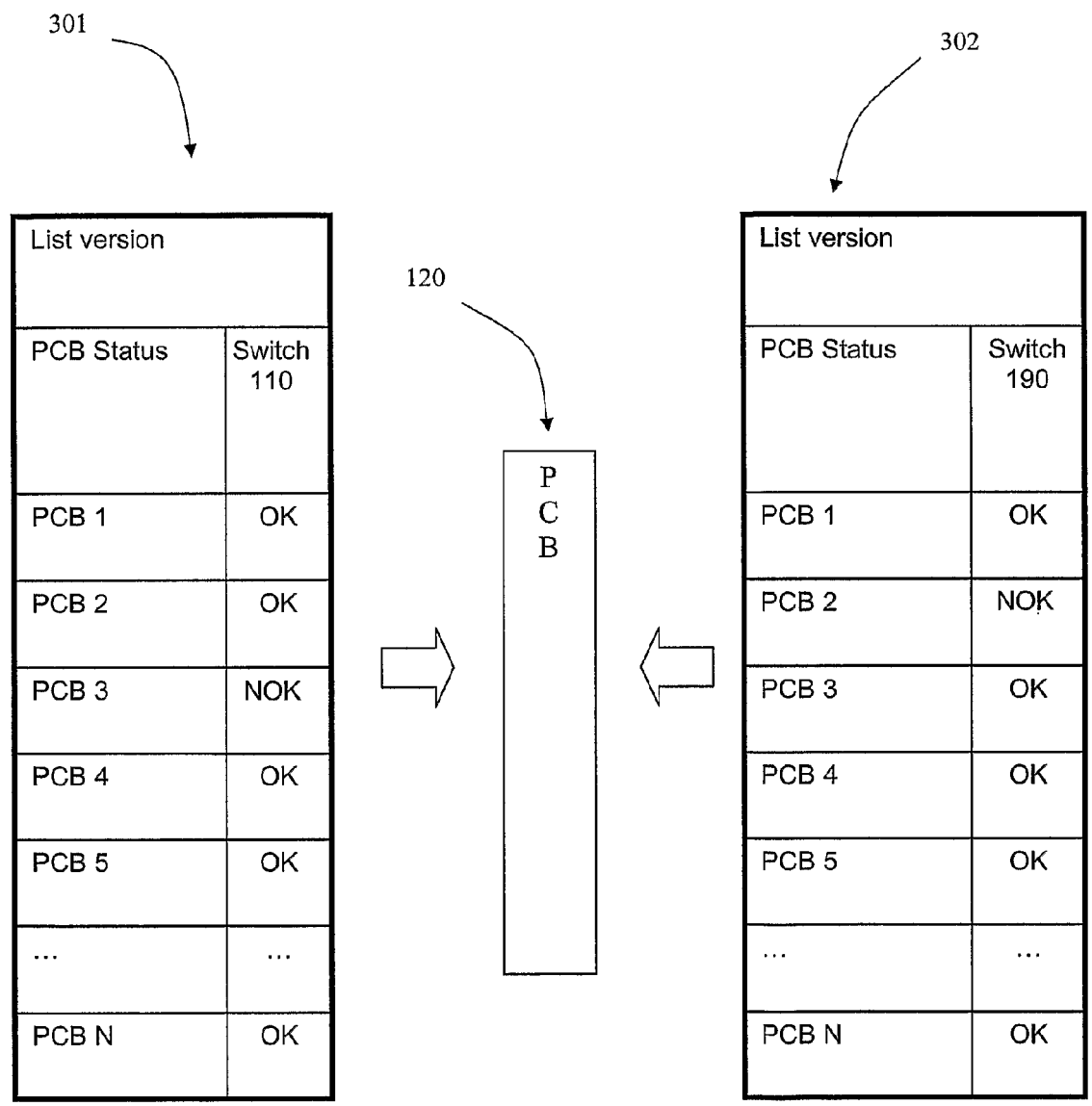
FIG. 3 shows a status list to be used in an arrangement of the invention.

An example of the use of status lists is shown in FIG. 3: a first 301 and a second 302 switch have compiled lists of the status of the various PCB:s 1-N in a particular arrangement 100. These lists are distributed to the PCB:s when polling them, illustrated with the PCB 120 as an example. Thus, PCB 120 should use switch 301 when sending messages to PCB 2, and switch 302 when sending messages to PCB 3. When PCB needs to send messages to the other PCB:s, i.e. not PCB 2 or 3, any combination of the switches may be used, i.e. one or both switches can be used.

As indicated at the top of the lists shown in FIG. 3, in one embodiment of the invention the lists may comprise a version number, which is only changed (for example increased by 1) when something in the network status list has changed. Thus will enable the PCB:s to save the list numbers, and thus the PCB:s only need to go through the list when a change actually has occurred.

Figure 4:
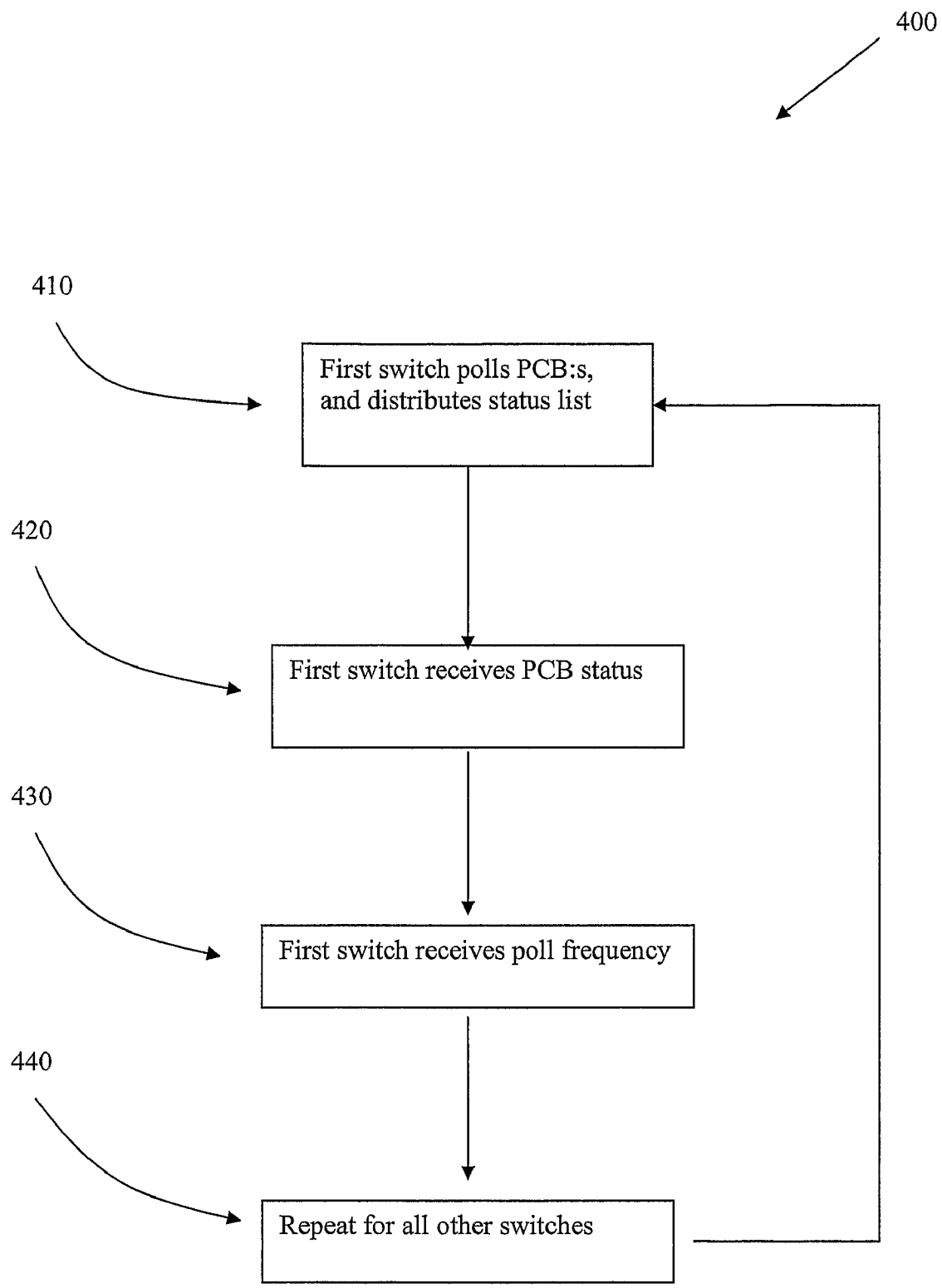
FIG. 4 shows a flow chart of some major steps in a method according to the invention.

In summary, a method according to the invention can be defined as comprising the following major steps, which are also illustrated in the flow chart 400 in FIG. 4:

A first switch 120 polls all of the PCB:s 120-160 in the arrangement 100, and receives their individual status, block 410. The status lists are stored in the switch, and distributed to the PCB:s in connection with the polling request.

The first switch then receives status messages from the PCB:s which it polls, block 420, and updates the status lists using this information.

If this features is included in the arrangement, the switch receives a poll frequency from some or all of the PCB:s, block 430 which is used for future polls.

The steps described above and shown in the blocks 410-430 are then repeated, block 440, by all of the switches included in the second plurality of switches used in the arrangement.

Thus, by means of the invention, a number of advantages are obtained in an arrangement with redundant communication links between PCB:s in a cellular telephony network. Among these advantages, the following might be mentioned:

A decreased traffic load devoted to supervision in the arrangement. For example in a network with 2 redundant Ethernet switches, i.e. a redundant switch pair, where each switch is connected to 50 PCB:s, and a required fail-over time of 100 ms, each switch would generate 50*2/0.1=1000 poll packets per second while all other PCB:s would receive 2*2/0.1=40 poll packets per second. This can be compared to one known solution, in which each PCB would generate 2000 polls per second.

Distributed supervision, as the supervision function is distributed to all switches in the network.

Flexibility, the protocol enables different polling periods for each PCB, reflecting different fail-over times requirements.

Simplicity of solution, no complex protocols with a great deal of overhead is needed in the implementation of the invention.

The invention claimed is:

1. An arrangement in a base station in a cellular mobile telephony system, comprising a first plurality of Printed Circuit Boards (PCB:s) and a second plurality of switches, with each of the PCB:s in said first plurality being connected to each of the switches in said second plurality, the arrangement being characterized in that each of the switches is equipped with means for communicating with and polling each of the PCB:s at predetermined intervals, said polling being with regard to the status of the PCB, the switches additionally being equipped with means for distributing status information to the individual PCB:s as an outcome of said polling, the arrangement additionally being characterized in that the PCB:s are equipped with means for communicating with each other via one, several, or all of the switches, and that said communicating means in the PCB:s are arranged to choose routes of communication based on said status information received from the switches.

2. The arrangement of claim 1, wherein the switches are Ethernet switches.

3. The arrangement of claim 1, wherein the switches' means for communicating with the PCB:s are the same as the PCB:s means for communicating with each other.

4. The arrangement of claim 1, wherein said predetermined polling intervals are determined by each PCB individually by means of information in the poll reply.

5. A method for use in a base station in a cellular mobile telephony system, the method comprising the use of a first plurality of Printed Circuit Boards (PCB:s) as well as the use of a second plurality of switches, according to which method each of the PCB:s in said first plurality is connected to each of the switches in said second plurality, the method being characterized in that each of the switches communicate with and polling each of the PCB:s at predetermined intervals, said polling being with regard to the status of the PCB, the switches additionally distributing status information to the individual PCB:s as an outcome of said polling, the method additionally being characterized in that the PCB:s may be used to communicate with each other via one, several, or all of the switches, and that the PCB:s are arranged to choose routes of communication based on said status information received from the switches.

6. The method of claim 5, wherein the switches communicate with the PCB:s using the same means as the PCB:s use for communicating with each other.

7. The method of claim 5, wherein said predetermined polling intervals are determined by each PCB individually by means of information in the poll reply.

* * * * *